Sept. 11, 1923.
L. B. SKINNER
FURNACE APPARATUS
Filed Feb. 24, 1920
1,467,509
2 Sheets-Sheet 2
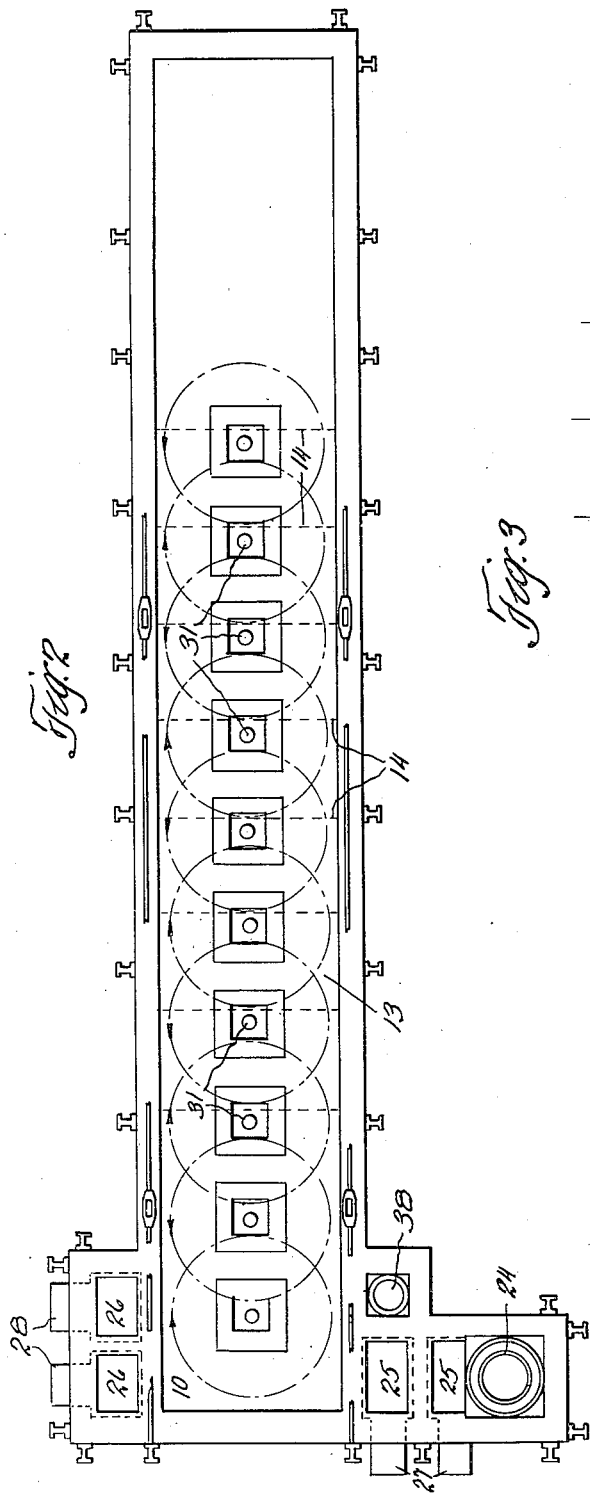
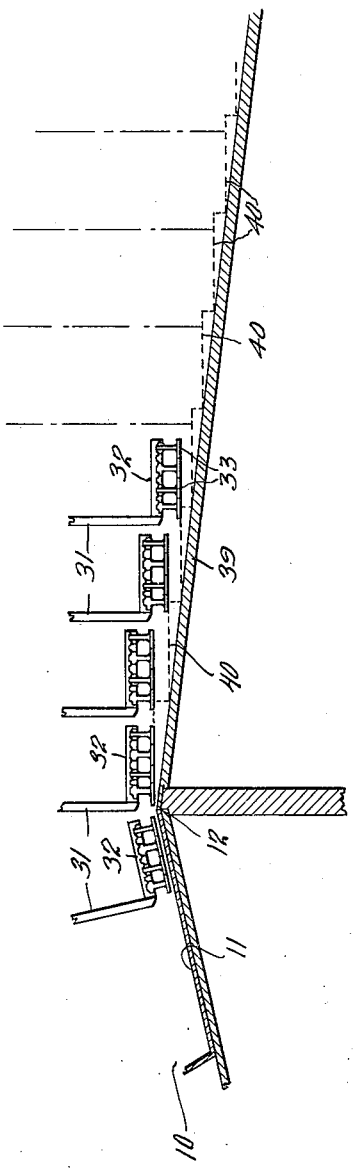
Inventor
Lewis B. Skinner
Attorney Patented Sept. 11, 1923.

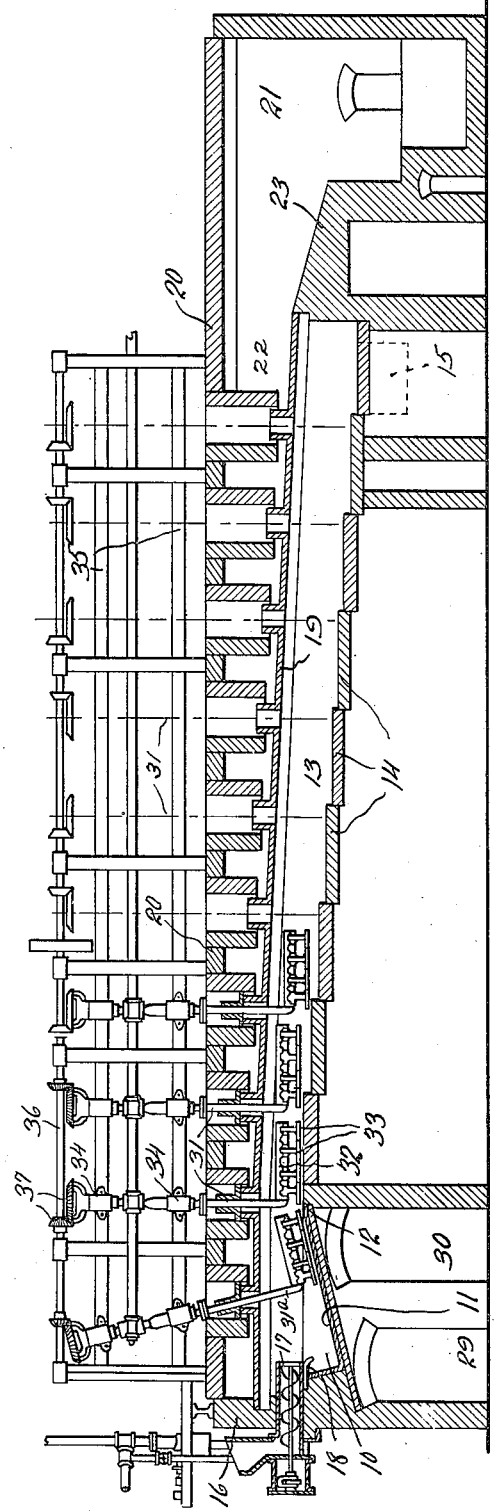

1,467,509

UNITED STATES PATENT OFFICE.

LEWIS BAILEY SKINNER, OF DENVER, COLORADO.

FURNACE APPARATUS.

Application filed February 24, 1920. Serial No. 360,949.

*To all whom it may concern:*

Be it known that I, LEWIS B. SKINNER, a citizen of the United States, residing at Denver, in the county of Denver and State of Colorado, have invented certain new and useful Improvements in Furnace Apparatus; and I do hereby declare the following to be a full, clear, and exact description of the invention, such as will enable others skilled in the art to which it appertains to make and use the same.

This invention relates to furnace apparatus; and it relates more particularly to mechanical furnace apparatus suitable for use in the manufacture of muriatic or hydrochloric acid and salt cake.

In my application Serial No. 359,955 filed February 19, 1920, I have described and claimed a muriatic acid and salt cake furnace of a type in which the present improvements may be incorporated with particular advantage; and in more particularly describing the present improvements hereinafter, an embodiment thereof in the type of apparatus disclosed in my co-pending application aforesaid will be referred to in detail in order to afford a full understanding of the principles of the invention. The present improvements are, however, capable of being embodied in furnace apparatus of other types, and the appended claims are therefore to be interpreted accordingly.

Various types of mechanical furnaces have been proposed heretofore for the manufacture of salt cake and muriatic acid; but so far as I am aware, none of these has proven highly satisfactory in practice. The principal difficulties encountered result from the characteristics and behavior of the raw materials and the resultant reaction mixture to be handled; and although these difficulties are most pronounced when the reagents employed are sulfuric acid and common salt, they are also experienced to a certain extent when niter cake (acid sodium sulfate) and salt are employed as starting materials.

In reacting between common salt and sulfuric acid, it is important that the salt be in sufficiently finely divided condition to ensure efficient reacting contact of the acid therewith; but on the other hand, the salt should not be too fine, because too rapid an attack of the acid would thereby be induced, resulting in excessive foaming and balling-up of the mixture. Under the most favorable conditions there is more or less tendency to balling up, that is, to formation of a coating over parts of the charge and cementing of these parts into balls which are only slowly penetrable by the acid. Where the salt particles are, say approximately one-eight of an inch in diameter, the reaction can be carried out most effectively. In practice, it is desirable to first form a soup-like mixture of the acid and salt or, as it is often expressed in practice, the salt should be dissolved in the acid charged. It has been found most satisfactory to use sulfuric acid known as "tower stock" which is 60° Baumé or 1.72 specific gravity with an acidity of approximately $77\frac{1}{4}$ per cent $H_2SO_4$ rather than to use stronger grades of acid. The action of this acid on the salt is sufficiently sluggish to permit the salt to "dissolve" in it. When salt and acid are mixed together, they form a liquid mass at ordinary temperatures, and the reaction between the two starts immediately with the evolution of hydrochloric acid gas mixed with some water vapor. Heat must be applied to keep the reaction going; and as more and more gases are evolved, the mass tends to thicken up and become difficult to rabble because it is neither wet nor dry but in a pasty or semi-viscous condition. As the heating is continued, hydrochloric acid gas and water are evolved until the residue tends to reach an almost dry state at a black-red temperature of from 400° to 500° C. The longer the time allowed for the calcination, and the more intimately the reagents are mixed together, the less is the necessity for a high finishing temperature; but if the mixing cannot be thoroughly effected, or if a relatively long period of time cannot be allowed for heating, a high finishing temperature must be used. Moreover, local overheating of even relatively dry material in this process results in fusion, which in turn causes scouring or fluxing of the hearth refractories, besides other troubles to be referred to hereinafter. The foregoing practical considerations impose certain conditions and requirements which mechanical furnaces heretofore proposed have failed to meet satisfactorily.

The sticky and viscous character of the reaction mass during a considerable part of its progress over the calcining hearth renders it particularly difficult to handle, and while the apparatus disclosed in my co-pending application aforesaid has proved efficient and satisfactory, I have found that still better results can be obtained by employing a special type of hearth construction, or by so arranging the mechanical rabbling or agitating devices relative to the hearth, or by employing both these expedients, that the rabbling mechanism can free itself automatically from adherent masses of the sticky viscous material which it is required to advance along the hearth, while at the same time attaining increased efficiency in the process as a result of the better and more intimate mixing of the materials incidentally obtained. The improved construction hereinafter described effects these desirable results in a highly advantageous manner and eliminates to a still greater extent than was possible, even with my earlier apparatus referred to, the necessity for employing manual labor to ensure proper functioning and operation of the furnace.

Typical apparatus embodying the principles of the invention as applied to a muriatic acid and salt cake furnace, is illustrated in the accompanying drawings, in which—

Fig. 1 is a central longitudinal section through the furnace;

Fig. 2 is a plan view of the same, with certain parts removed, and

Fig. 3 illustrates, more or less diagrammatically, another form of hearth construction within the scope of the invention.

Referring more particularly to Figs. 1 and 2, which illustrate a furnace of the muffle type, the furnace comprises an elongated hearth consisting of a mixing pot or pan 10 with a substantially plane bottom 11, inclined upwardly to a discharge lip or rim 12; and a finishing hearth, indicated generally at 13, adapted and arranged to receive material discharged thereupon from the mixing pan 10 and having a general downward inclination away from the lip or rim 12. In the construction illustrated in Figs. 1 and 2, which is at present considered particularly desirable, the finishing hearth comprises a series of steps or terraces 14 arranged in descending succession, as shown, toward a discharge opening 15 in the side of the furnace. The mixing pan 10 may desirably be an integral iron casting and adapted to contain a liquid reaction mixture. The finishing hearth may be composed of fireclay, tile, or other suitable refractory material laid and suitably supported in the stepped or terraced arrangement illustrated. Through the front wall 16 of the furnace, project salt feeding means 17, and acid feeding means 18, whereby proper amounts of salt and sulfuric acid may be fed to the receiving and mixing pan. In practice, the main finishing or calcining hearth 13 may constitute about three-fourths or more of the entire length of the combined furnace hearth, including the mixing pan. The steps or terraces of this finishing hearth are also most desirably substantially plane.

At a suitable distance above the furnace hearth is the muffle roof or arch 19, extending the full length of both the pot or mixing pan and the finishing hearth, and suitably supported on the side walls of the furnace. In an especially desirable embodiment of the invention, said muffle arch is of such character as to transmit heat readily from its upper external surface to the subadjacent hearth; and to this end it is most desirably composed of refractory material of much greater heat conductivity than fireclay brick. A muffle arch or roof constructed of carborundum brick offers special advantages in this connection, both because of the relatively high heat conductivity of carborundum and also because of its chemical inertness or passivity. A roof of this material transmits heat from the above with the requisite rapidity while at the same time it remains tight and seldom requires repair. Silica brick though of somewhat lower heat conductivity than carborundum brick are much more heat conductive than fireclay, and may therefore be employed. A metal muffle roof, consisting for example of a series of arched iron castings is desirable from the standpoint of heat conductivity, but it is much more difficult to keep such a roof tight. Moreover, while the embodiment of a muffle roof of relatively high heat conductivity is desirable, as stated, the present invention in its broader aspects is in no sense restricted thereto.

Above the muffle arch or roof 19, and suitably spaced away therefrom, is a second arch 20 constituting the outer roof of the furnace. This outer arch or roof is composed of any suitable refractory material such as firebrick, tile, or the like, and it extends considerably beyond the discharge end of the hearth to form the roof of the combustion chamber 21 of the gas producer furnace or other suitable firing means by which the furnace is supplied with the necessary heat. The heating space 22, between the muffle arch and the outer roof of the furnace, communicates directly with the firing means as shown, hot flame and flame gases from the latter thus being able to pass directly over bridge wall 23, into and through said heating space 22, and traveling longitudinally of the furnace adjacent the outer surface of the muffle arch toward the feed end of the hearth. The muffle arch 19 may desirably, though not necessarily slope down to parallel more or less approximately the general downward inclination of the finishing hearth. Where this construction is adopted, and the outer furnace roof 20 is maintained horizontal as here shown, the heating space 22 is largest at the end nearest the firing means, and grows gradually smaller toward the feed end of the furnace, where the heating gases are of course cooler and reduced in volume. In passing through the space 22, said flame and flame gases part with the greater portion of the available heat units carried thereby, the heat being transmitted through the heat-conductive muffle roof down upon the furnace hearth, the heating effect on the hearth being most intense near the end adjacent the firing means.

After passing through the heating space 22 above the muffle arch, the combustion gases reduced in temperature, may be led through suitable flue means to the stack 24, either directly or after giving up further heat units to the mixing pot or pan by being caused to pass beneath the latter en route to the stack. Provision may be made whereby the combustion gases, after passing over the muffle arch, may also be led under the hearth on their way to the stack to heat the same to any desired desired extent in cases where special conditions or circumstances may render this convenient or advisable either temporarily or continuously. Where a highly conductive muffle arch or roof is employed as in the particular construction here illustrated, it is ordinarily unnecessary to heat the finishing hearth from below to a great extent, if at all. A flue system whereby the combustion gases, after passing over the muffle hearth, may be led directly to the stack, or after passing under the mixing pan, or after being led underneath the finishing hearth, or both, is disclosed in my copending application aforesaid, and is therefore not described in detail here. It may be noted, however, that in Fig. 2 are illustrated flues or downcomers 25 and 26, one on each side of the furnace, for leading the gases downwardly from the heating space 22. Said downcomers are provided respectively with suitable dampering means 27 and 28, whereby flow of gases therethrough can be regulated and controlled in such manner as to direct said gases through and to any part of the underlying flue system. The arrangement and cross sectional area of downcomer 25 is such that when it is fully open the tendency is for all the gases coming from the heating space 22 to pass down through 25 and thence directly to the base of the stack 24. In this case, all the fire gases are discharged directly to the stack without passing under either the finishing hearth or the mixing pan. On the other hand, if downcomer 25 be dampered to cut down the effective outlet capacity to a sufficient extent, combustion gases will pass from the heating space 22 through downcomer 26, thence transversely under the mixing pot or pan through ports 29 and 30 to the stack. By blocking up ports 29 and 30, the combustion gases may be deflected and made to pass underneath the finishing hearth through suitable flues, as more fully descirbed in my copending application aforesaid.

In order to advance materials from the mixing pan or pot 10 to the finishing hearth 13, and thence along the latter to the discharge end of the furnace, mechanically driven stirring and rabbling means are provided; and at least such portion of said stirring and rabbling means as is employed to work the reacting materials down the inclined finishing hearth to the salt cake discharge 15 should be of a revoluble rabble arm type cooperating in a manner to be more fully hereinafter described, with the stepped or terraced hearth. In the particular example shown, the same type of stirring and rabbling mechanism is employed both for the mixing pan and for the finishing hearth and it comprises a plurality of rabble shafts 31, extending through both the outer roof and muffle arch of the furnace, each being provided at its lower end with an arm 32, mounted upon the shaft substantially at right angles thereto, and carrying rabble teeth or plows 33. The series of rabble shafts 31 are suitably mounted in the center line of the furnace, as is best shown in Fig. 2, and are so spaced apart that their attached rabble arms sweep intersecting or overlapping circles. Said shafts are journaled in suitable bearings 34 on a supporting framework indicated generally at 35 which in this instance is arranged above the furnace, said shafts being driven in any suitable manner, as for example, by means of driving shaft 36 which transmits power through beveled gears 37. The arrangement is such that alternate rabble arms rotate in opposite directions, as indicated in Fig. 2, the rabble arms bearing a fixed angular relation to each other and being arranged to sweep overlapping hearth areas without interfering one with another. It will be seen that each rabble shaft and arm are so arranged that the arm revolves in a plane substantially parallel to the hearth; the rabble shaft 31ª at the feed end of the furnace being thus required to be mounted obliquely as shown, so that its attached rabble arm may cooperate properly with the inclined plane bottom of the mixing pan. Most desirably, the rabble arms are detachably secured to their respective rabble shafts in order to facilitate ready removal and replacement if necessary. In the best form of the apparatus, the rabble shafts and arms are provided with internal passages whereby said shafts and arms may be air-cooled as described in my copending application aforesaid.

In the apparatus here illustrated, there are ten rabble shafts and arms comprised in the complete rabbling and agitating system, but this number may be varied of course in accordance with practical requirements. The majority of the rabble arms, in this instance all but the first two counting from the left, sweep in circles each of which is above two sections of the stepped or terraced finishing hearth at different levels; and most desirably the center line of each of the corresponding rabble shafts is located adjacent the forward edge of each step or terrace as shown. The purpose of this arrangement will appear more fully hereinafter.

In employing the furnace for the manufacture of muriatic acid and salt cake, common salt and sulfuric acid are fed to the mixing pan 10 in proper reacting proportions and at a suitable rate of speed. The resultant soupy mixture or "solution" of salt in acid is thoroughly agitated and stirred by the rabble device provided for the mixing pan; and as portions of the reaction mixture thicken up and become semi-solid, these portions are advanced up by the inclined bottom of the mixing pan by the action of the rabble teeth and are brought within the range of action of the second rabble device which transfers the material from the lip of the mixing pan to the upper end of the finishing or calcining hearth. At this stage the mixture contains large proportions of acid sodium sulfate and salt, and at the temperature prevailing in this part of the furnace is a semi-fluid viscous mass. This material is worked by the rabble mechanism into effective range of the third rabble device, by the third to the fourth and so on down the series, the alternating reversals in direction of rabble arm movement being very effective to thoroughly agitate and break up the material as it is advanced. Moreover, as each arm with its attached rabble teeth swings out over the next succeeding hearth step or terrace, any viscous and semi-fluid material sticking thereto has an opportunity to flow down and hang below the rabble teeth; and as the slowly revolving arm swings back over the hearth step or section next above, those portions of the material sticking to the rabble teeth, and hanging therebelow are sheared off and in this way dropped down upon the lower hearth step, from which they are then transferred to the next succeeding step or terrace by the action of the rabble arm next in series. As the material is advanced down the succession of hearth steps, it gradually dries out owing to the completion of the reaction between sodium acid sulfate and sodium chlorid which results in evolution of hydrochloric acid gas and the production of salt cake or sodium sulfate which is a much drier material and is easier to handle. The long inclined finishing hearth gives ample opportunity for prolonged exposure of the reacting materials to calcining heat, and the action of the described arrangement of rabbling mechanism, especially in conjunction with the stepped or terraced hearth formation, produces salt cake substantially free of sodium chlorid and acid sodium sulfate, said salt cake being discharged through the discharge opening 15 at the lower end of the furnace. The hydrochloric acid gas evolved passes out through an offtake 38, and thence to a suitable absorption train, not shown, appropriate exhauster means being provided to draw the gas through the absorbers in a manner well understood in this art.

In Fig. 3 is illustrated more or less diagrammatically another arrangement of mixing pan and finishing hearth whereby the advantages of the invention can be realized to a substantial degree without stepping or terracing the hearth according to the specific construction illustrated in Figs. 1 and 2. In this modified type of construction, the finishing hearth is indicated generally at 39 as a substantially plane hearth sloping gently downward from the discharge lip 12 of the mixing pot or pan. The arrangement of rabble shafts and arms 31, 32, is substantially the same as before, the rabble arms, after the first in the series, revolving in parallel planes which in this instance are substantially horizontal and which therefore are at an angle to the general inclination of the finishing hearth. Each of the arms after the third in the series is set to revolve in a plane slightly below that of the preceding arm, and the arms are arranged to sweep over intersecting or overlapping circular hearth areas all as previously described. But in this case the reaction materials themselves are relied upon to build up steps or terraces as indicated in dotted lines at 40 corresponding more or less approximately to the steps or terraces 14 of the hearth construction shown in Figs. 1 and 2. This occurs in actual practice owing to the tendency of the reaction mass to form a hard mass of salt cake on the hearth. The shearing action upon viscous material depending from the rabble arms and teeth of the stepped series therefore occurs in this case also with the same desirable effect both of ensuring thorough mixing and breaking up of the material as well as of rendering the rabble arms self-clearing and thus obviating to a great extent the necessity for having workmen clear the rabble arms and teeth of material stuck thereto by means of bars inserted through the working doors at the sides of the hearth. As before pointed out, the rate at which the rabble arms are revolved is so slow that the semi-fluid viscous material being worked along the hearth has an opportunity to drop considerably below the lower surfaces of the rabble teeth as the arms swing out over the next succeeding lower section of the hearth.

Where a highly conductive roof is employed in order that the heat units necessary to effect proper heating of the finishing hearth are transmitted wholly or chiefly through the roof, without heating the hearth from below to the extent heretofore customary in actual practice, as disclosed in my copending application aforesaid, the additional advantage is secured that operation is much smoother and may be conducted continuously for a much longer time than has been possible heretofore. It is to be understood, however, that the present invention is not restricted in its broader aspect to the employment of such conductive muffle roof.

In order to afford a full understanding of the principles of the invention, a specific furnace structure has been hereinabove described in detail; but it is to be understood that various changes may be made in the construction illustrated and described without departing from the spirit of the invention.

What I claim is:

1. Furnace apparatus comprising the combination, with a substantially continuous hearth having a series of steps or terraces descending sucessively substantially the entire length of the hearth toward a place of discharge, of a plurality of cooperating revoluble rabble devices arranged respectively to revolve over two adjacent steps or terraces, substantially as set forth.

2. Furnace apparatus comprising the combination, with a substantially continous muffle hearth characterized by a general downward inclination toward a place of discharge, of a plurality of revoluble rabble arms disposed in series along substantially the entire length of the hearth in terrace arrangement (or en cascade), and cooperating to advance material along said hearth to such place of discharge, substantially as set forth.

3. Furnace apparatus for the treatment of viscous materials, which comprises a substantially continous muffle hearth provided substantially throughout its entire length with depressions, stirring means arranged to sweep over and across said depressions, and means arranged to remove material deposited in said depressions.

4. Furnace apparatus comprising the combination, with a substantially continous muffle hearth having a general downward inclination toward a place of discharge, of a plurality of rabble devices arranged in series extending substantially to said point of discharge and revoluble in parallel and successively lower planes at an angle to the general direction of inclination, and said rabble devices being arranged to sweep above over lapping hearth areas.

5. Furnace apparatus of the muffle type comprising the combination, with a substantially continous working floor stepped or terraced over substantially its entire length, of a series of revolving agitators sweeping intersecting circular areas at different levels on said floor and adapted and arranged to advance material thereover from a higher to a lower level, substantially as set forth.

6. Furnace apparatus of the muffle type comprising the combination, with a substantially continuous working floor having a general downward inclination toward a place of discharge, of a series of agitators revolving in successively lower planes at an angle to said general inclination and in intersecting circles, such arrangement extending substantially the entire length of said floor, said agitators being adapted and arranged to advance material along said floor toward said place of discharge, substantially as set forth.

7. A muriatic acid and salt cake furnace comprising the combination with a mixing pan having a discharge lip, of a muffled finishing hearth arranged to receive material from said pan and having a general downward inclination away from said lip, means for transferring material from said pan to said finishing hearth, and a series of rabble devices revoluble in overlapping circles for advancing material toward the lower part of said hearth, a majority of said rabble devices being mounted to revolve in successively lower planes at an angle to the general hearth inclination, substantially as set forth.

8. A muriatic acid and salt cake furnace comprising the combination with a mixing pan having a substantially plane bottom inclined upward to a discharge lip, of a muffled finishing hearth arranged to receive the material from said pan and comprising a series of descending steps or terraces, a series of revoluble rabble arms cooperating to advance material from said pan to said hearth and thence down the steps thereof, said arms sweeping overlapping circles in planes respectively adjacent successive steps or terraces, substantially as set forth.

In testimony whereof I hereunto affix my signature.

LEWIS BAILEY SKINNER.